United States Patent [19]

Oget

[11] Patent Number: 4,803,685

[45] Date of Patent: Feb. 7, 1989

[54] METHOD AND DEVICE FOR THE TRANSMISSION OF DIGITAL DATA BY MESSAGES ORGANIZED IN FRAMES

[75] Inventor: Christian Oget, Draveil, France

[73] Assignee: Cimsa Sintra, Asnieres, France

[21] Appl. No.: 21,253

[22] Filed: Mar. 3, 1987

[30] Foreign Application Priority Data

Mar. 6, 1986 [FR] France .................................. 8603133

[51] Int. Cl.[4] .......................................... G08C 25/02
[52] U.S. Cl. .......................................... 371/33; 371/36
[58] Field of Search .......................... 371/32, 33, 36, 5

[56] References Cited

U.S. PATENT DOCUMENTS

| 3,676,846 | 7/1972 | Busch | 371/33 |
| 3,754,211 | 8/1973 | Rocher et al. | 371/33 |
| 3,906,445 | 9/1975 | Beckmann et al. | 371/69 |
| 4,332,027 | 5/1982 | Malcolm et al. | 371/33 X |
| 4,439,859 | 3/1984 | Donnan | 371/32 |
| 4,511,958 | 4/1985 | Funk | 371/33 X |

FOREIGN PATENT DOCUMENTS 2029170  3/1980  United Kingdom .

Primary Examiner—Charles E. Atkinson
Attorney, Agent, or Firm—Oblon, Fisher, Spivak, McClelland & Maier

[57] ABSTRACT

A method for effectuating the transmission and reception of digital data on frames on duplex links between transmitter and receiver stations. Data and command messages comprised of frames are transmitted from a transmitter station, each frame being comprised of a packet of data. The command and data messages are received by a receiver station which transmits acknowledgment frames back to the sending station. The transmitter station continues to send the command and data messages until their corresponding acknowledgment frames are received.

17 Claims, 6 Drawing Sheets

FIG_1
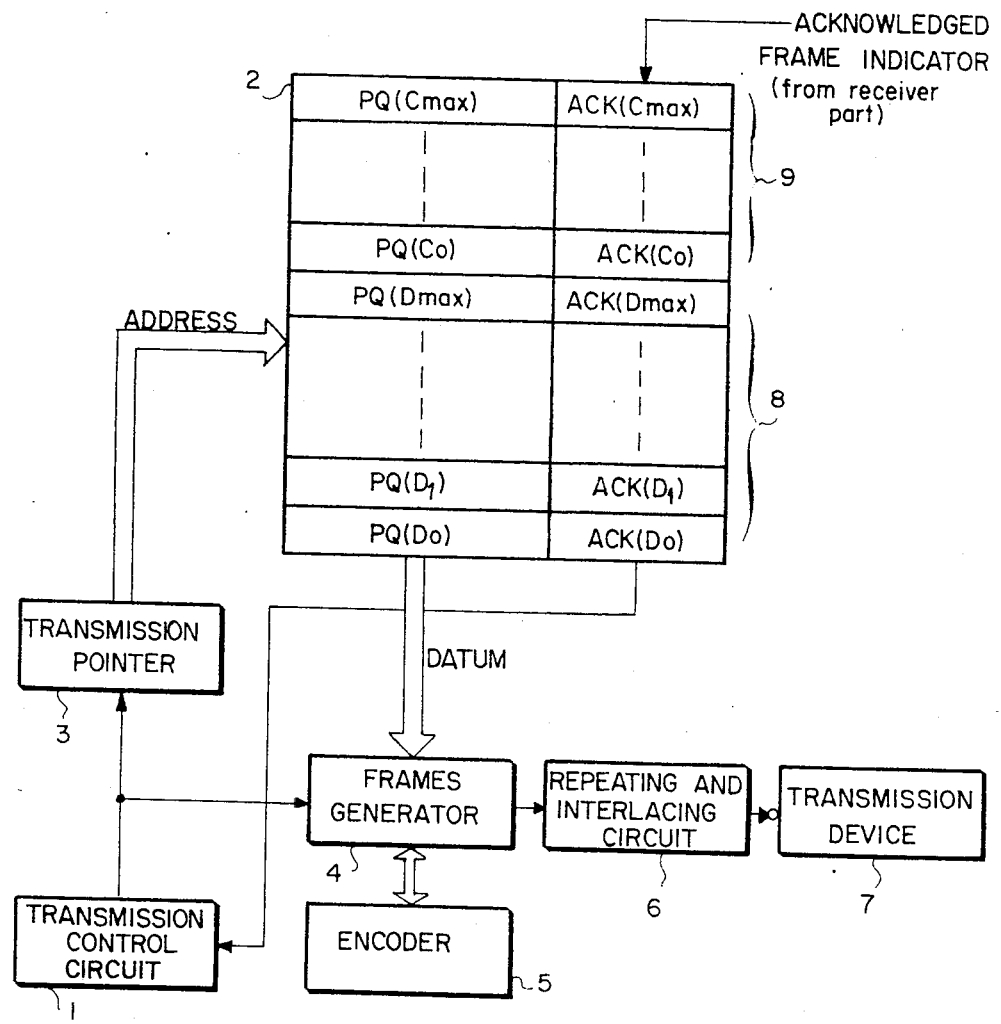

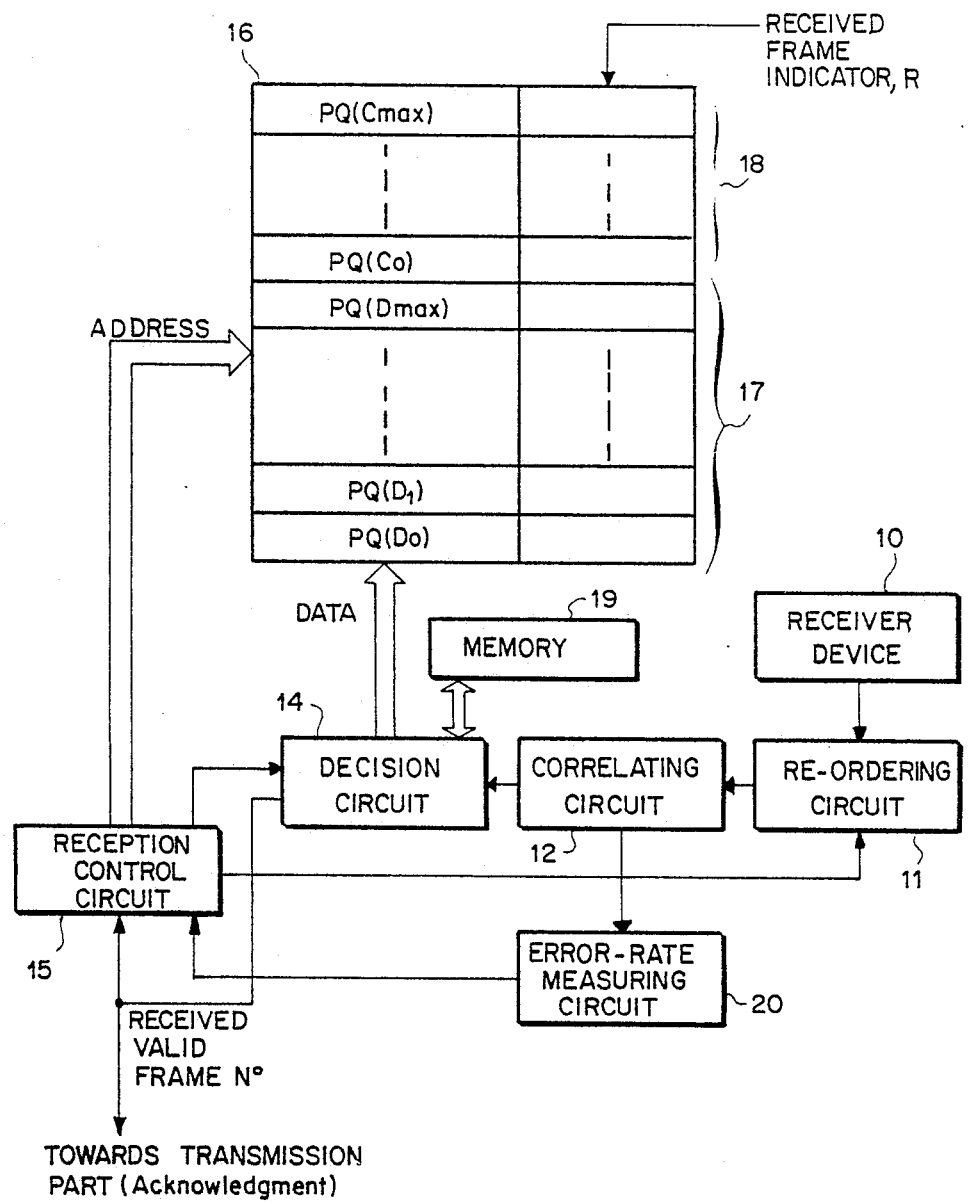
FIG_2

FIG_3
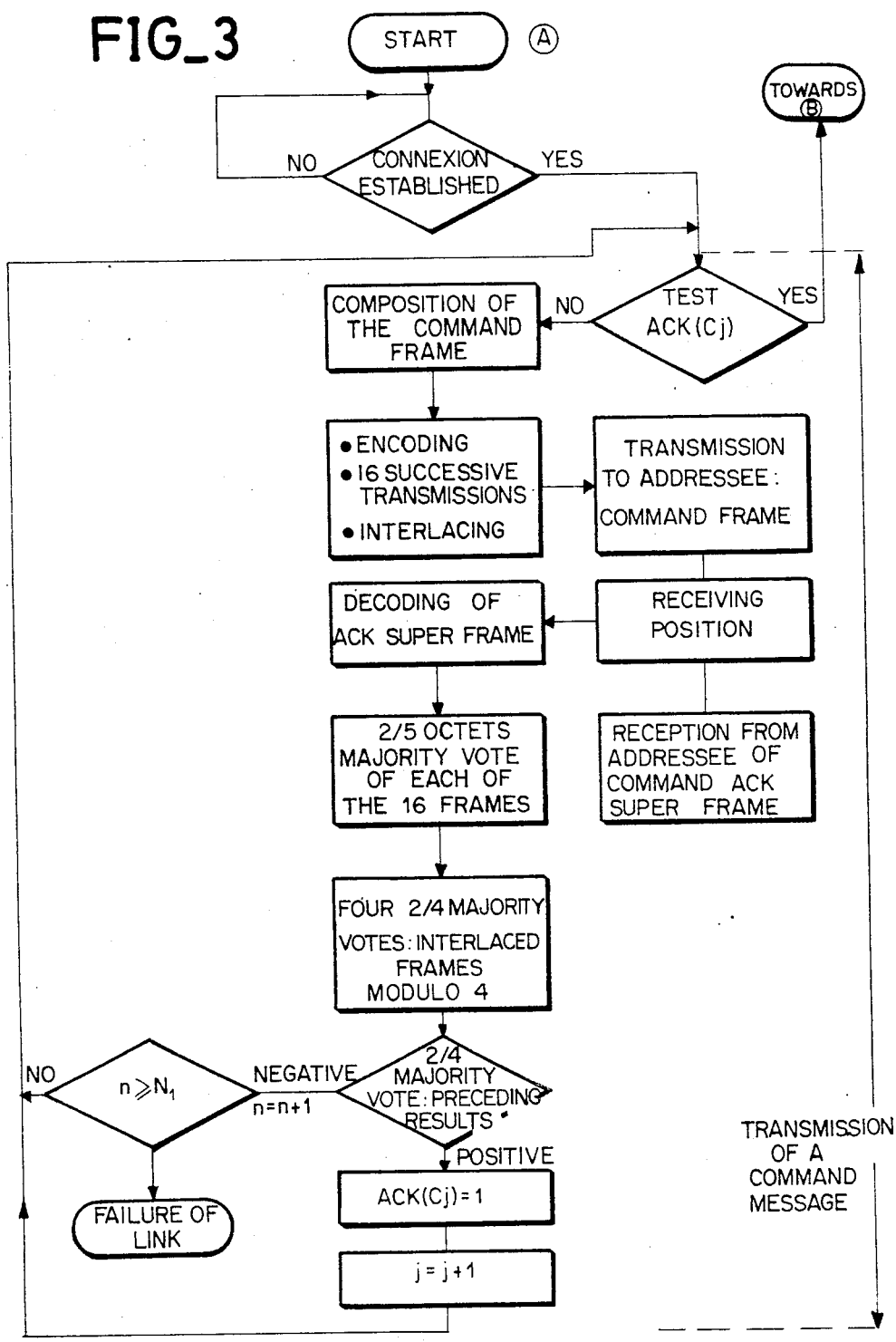

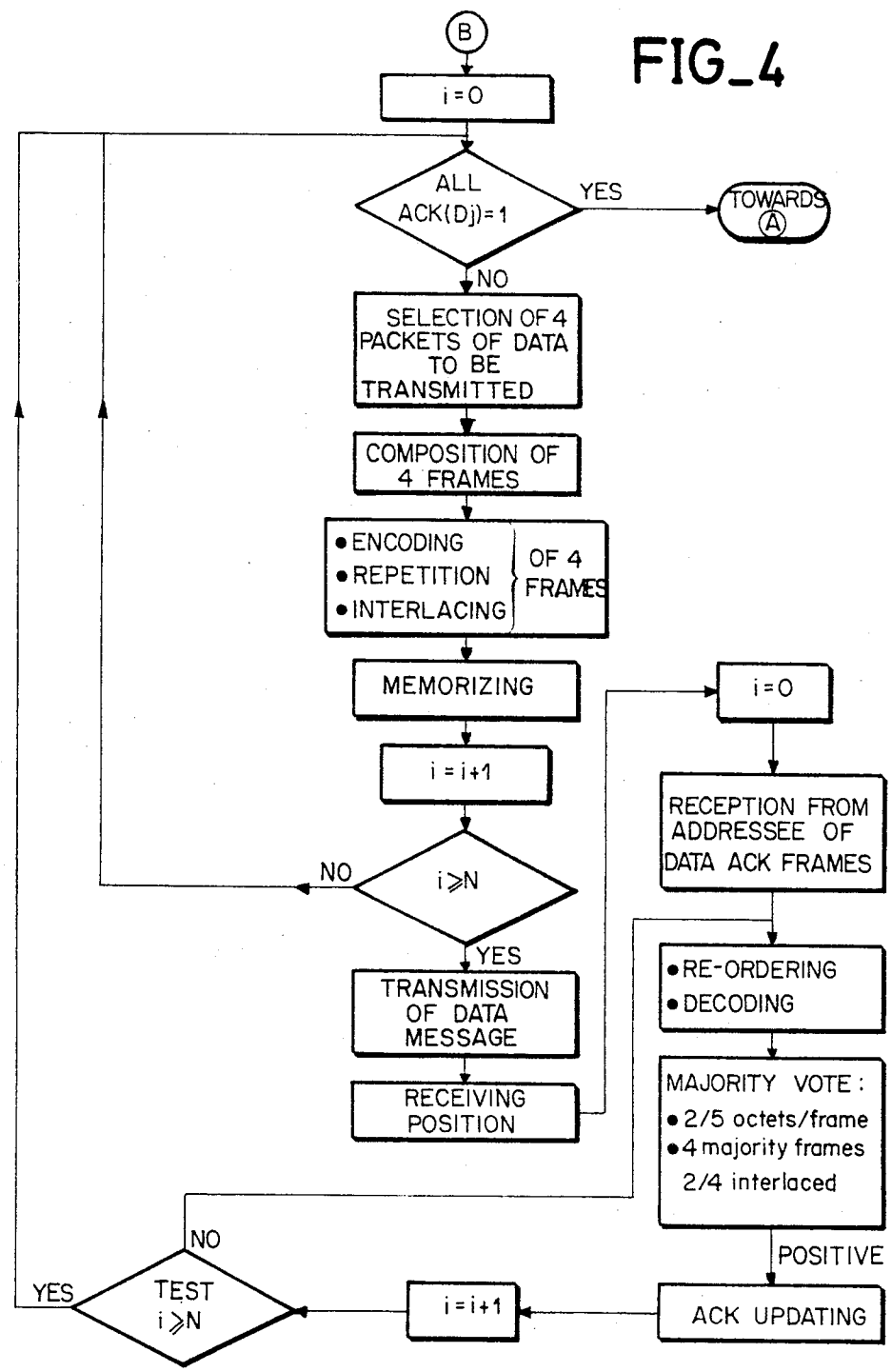

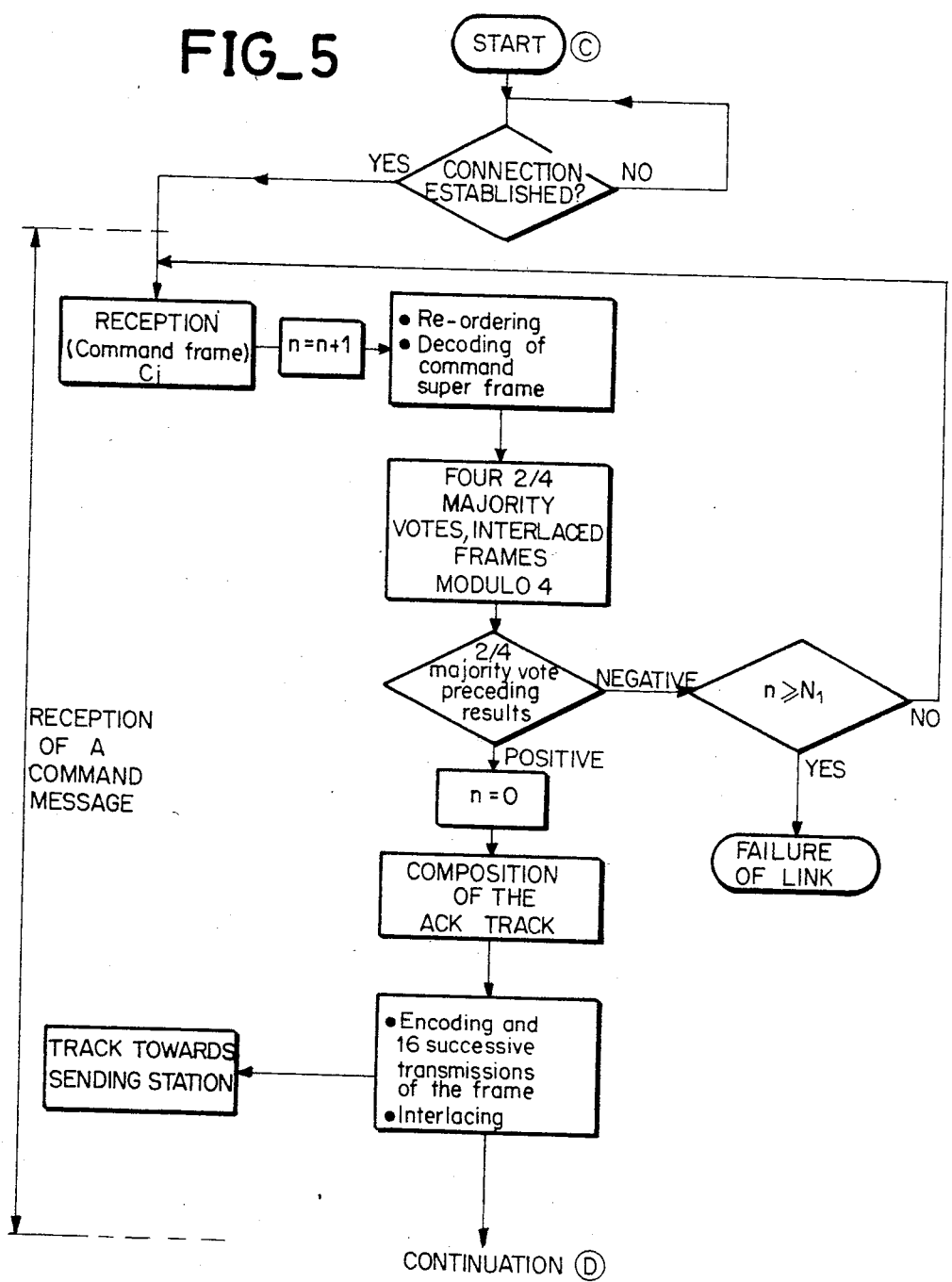

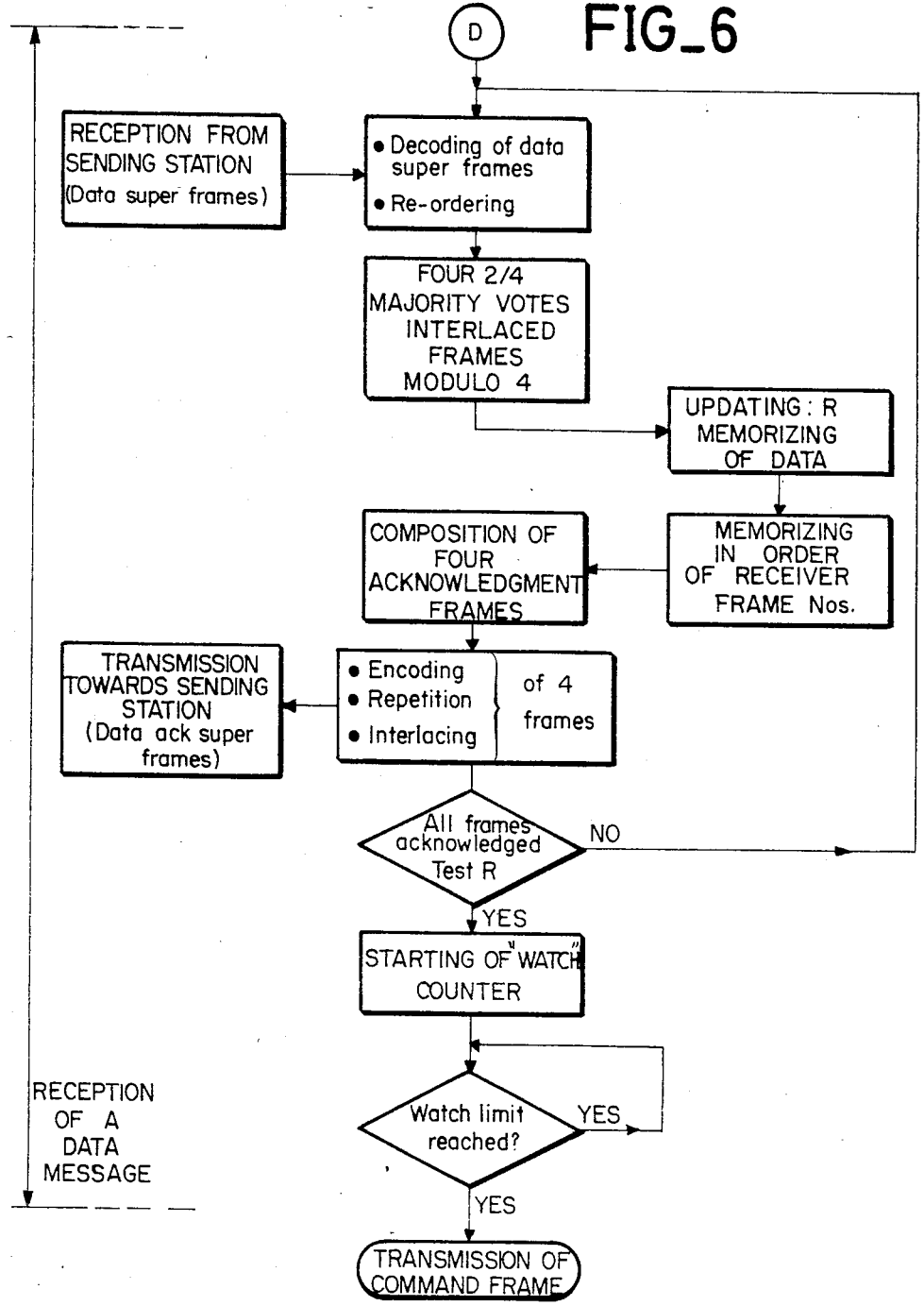

METHOD AND DEVICE FOR THE TRANSMISSION OF DIGITAL DATA BY MESSAGES ORGANIZED IN FRAMES

BACKGROUND OF THE INVENTION

1. Field of the Invention

The present invention pertains to the field of digital data transmission. More particularly, its object is a method for the transmission of this type of data in messages organized in frames, and the device for using this method.

A network or chain for the conveyance of digital data generally requires several transmission media, each with specific characteristics: radio links, cable links, optic fiber links etc.

Microwave radio links are known to be vitiated by a relatively large number of errors, especially under certain limit conditions such as limits of range, fading due to mobility or atmospheric conditions or, more generally, to the environment, interference etc. Furthermore, such radio links can be affected for long transmission periods, especially for satellite links or links requiring relays. The distribution of errors combines a distribution of isolated errors and a distribution of errors in groups.

2. Summary of the Invention

By contrast, wire type or optic fiber type links are affected by a far smaller rate of errors.

The object of the present invention is a method for the transmission of digital data by messages organized in frames, providing for the transmission of this data swiftly and practically without residual errors, even when the conveying network or chain uses poor-quality links or modifies the transmission chain. This type of modification or "reconfiguration" of the transmission chain is reflected in breaks with or without loss of information.

To obtain this result, the data-transmission method according to the invention can be adapted in its characteristics to the quality of the link: it combines several techniques for the correction and/or protection of transmissions, this combination being suited at each instant to the quality of the link. These techniques which are known per se are chiefly:

The use of error detecting/correcting codes, the errors being detected and corrected by self-correlation;

The repetition of the frames transmitted;

The interlacing of the frames transmitted;

The selective re-transmission of poorly received frames.

However, according to the invention, these various characteristics are combined to obtain, at each instant, the highest possible efficiency of transmission and the greatest possible speed compatible with this quality at tht instant.

The invention comprises a method for the transmission of data by command messages or data messages comprising frames, on duplex links between transmitter-receiver stations, wherein a sending station in the transmitter position transmits, in each command message, a packet of data comprising the nature of a command and the corresponding data and, in each data messsage, frames made up of N packets of information each comprising a packet of data and the associated order number, wherein the transmission of each message before the transmission of the following message by the sending station gives rise to:

The transmission, by the receiver station, of acknowledgment frames, in which, for a command message, the nature of the command is retransmitted to the sending station and, for a data message, the numbers of the properly received data packets are retransmitted to the sending station, And gives rise, upon the reception of these acknowledgment frames by the sending station, to the repetition of the command message if the corresponding acknowledgment message is not received and to the selective repetition of the frames made up of data packets, the numbers of which have not been detected in the acknowledgment frames.

Another object of the invention is a device for the application of this method, the transmitting and receiving parts of this device being easily embodied in digital form.

BRIEF DESCRIPTION OF THE DRAWINGS

The invention will be better understood and other characteristics of it will emerge from the following description made with reference to the appended figures of which:

FIG. 1 represents the transmitting part of a transmitter-receiver according to the invention;

FIG. 2 represents the receiving part of a transmitter-receiver according to the inventon;

FIGS. 3, 4, 5 and 6 represent flow charts depicting the method of transmission according to the invention.

DESCRIPTION OF THE REFERRED EMBODIMENT

The transmission device according to the invention comprises transmitter-receiver units, each of which has a transmitting part and a receiving part. For a given link, a transmitter-receiver working as a transmitter uses its transmitting part to send the frames comprising the message while it uses its receiving part to send the so-called acknowledgment frames as explained below. Conversely, a receiver station uses its receiving part to receive the frames constituting the awaited message while it uses its transmitting part to send back the acknowledgment frames corresponding to the acquired message frames. Each of the stations is, of course, capable of acting as a transmitter station or a receiver station depending on the direction of the transmission in a duplex link.

The following description, made with reference to FIGS. 1 and 2, which respectively depict the transmitting and receiving parts of the transmitter-receiver according to the invention, will subsequently enable a detailed description of the digital data transmission method according to the invention. The central element of the transmitting part is a transmission control circuit 1 which manages a memory 2 by means of a transmission pointer 3. The transmission control circuit is also linked to the command input of a frames generator 4, the data input of which is linked to the corresponding data output of the memory 2; this frames generator is linked to an encoder 5 which receives the data coming from the memory 2 through the frames generator and restores this data to the said memory 2 after encoding. The encoded frames are then transmitted to a repeating and interlacing circuit 6 linked to the output of the frames generator; the output of the interlacing circuit is linked to a transmitting device 7. The adaptation circuits suited to the electrical nature of the transmission network have not been depicted.

The data memory 2 is divided into two zones: one, bearing the reference 8, constitutes the buffer of the data to be transmitted while the other, bearing the reference 9, constitutes the buffer of the message-checking data.

With each data packet "PQ($D_i$)" or command packet "PQ($C_i$)" is associated, in this memory, a bit "ACK-($D_i$)" or "ACK($C_i$)" indicating whether the packet considered has been acknowledged or not, i.e. whether it is considered to have been properly received by the receiving terminal.

The transmission pointer 3 may independently address the "data" field of a packet during reading or the "acknowledgment" field of a packet during "writing".

This set can be made by means of discrete integrated circuits, organized as an encoding sequencer, or by means of a computer or microprocessor carrying out a recorded program and usingits own resources or auxiliary resources to fulfil the encoding and framing functions. The memory may be a simultanous read/write memory or it may use the random-access memory of the computer or microprocessor on a shared-time basis.

FIG. 2 depicts the receiver part of a transmitter-receiver according to the invention. A receiving device 10 transmits the detected data to a re-ordering circuit 11, the output of which is connected to a correlating circuit 12. The correlating circuit restores the decoded frames which it transmits to a decision circuit which functions according to a majority vote principle as will be explained below. This circuit 14 determines the numbers of the frames received by a reception control circuit 15 which generates an order to send an acknowledgment message for these frames and sends the said order to the transmitting part. The decoded data coming from the decision circuit are transmitted to memory 16 addressed by the reception control circuit 15. This memory 16 is divided into two zones, in the same way as the memory 2 in the transmitting part: the first zone bearing the reference 17 is the received data buffer while the other zone, bearing the reference 18, is the command data buffer. With each memory zone designed for the memorizing of a packet of data is associated a reception-indicating one-bit zone R.

The decision circuit 14 is also linked to an annex memory 19 of frames not accepted at the first reception. This memory makes it possible to use the frames obtained during a first reception with those received during the following reception, in the decision circuit 14. The reception control circuit 15 has an output linked to a corresponding input of the decision circuit 14 to order, if necessary, a modification of the control conditions of the majority-vote decision. The correlating circuit 12 is also linked to the input of an error-rate measuring circuit 20, the output of this circuit being linked to a command input of the reception command circuit 15. This error-rate measuring circuit 20 receives indications for error correction from the correlating circuit 12 and gives the reception control circuit 15 the information needed to order the elimination or, on the contrary, the re-establishment of a redundancy applied to the transmission on the frames. This functioning, linked to the transmission procedure according to the invention, will be explained in greater detail below.

In the same way as in transmission, the receiving function can be embodied by means of discrete integrated circuits organized as a sequencer-decoder, or by means of a computer or microprocessor carrying out a recorded program and using its own resources or auxiliary resources to perform the functions of de-framing and decoding.

In general, data is transmitted from a transmitter-receiver station in the transmitting position to a receiver-transmitter station in the receiving position in the following way, in duplex: the connection is set up between the terminals according to the usual signalling protocols, which are specific to the communications network and will not be described herein. Data is exchanged between terminals by messages, each of which can comprise a maximum of 256 frames. These frames will be precisely defined below. Unless the link is interrupted and then re-established, or unless a time delay is introduced, each new message can be transmitted only if the previous message has been completely acknowledged by the addressee, i.e. properly received by him.

The message are either command messages or data messages.

Each data message comprises a certain number of frames: each frame comprises a header, for example a pseudo-random string of 31 or 32 bits with known self-correlating properties, this header being followed by an octet comprising the frame number and then by a four-octet data packet. The bits of each of the octets of the field of the frame number and of the data field are "overcoded" by means of a pseudo-random string of 7 bits for example, the bits 0 and 1 being overcoded by complementary pseudo-random strings. The data field has a constant format during transmission and is nil during the acknowledgment frames which thus have only the header and the frame number octet.

For the command messages, a frame is made up as follows; the first four-octet field is the header, of the same type as the one described above; the second field, with a length equal to one octet, has the meaning of the nature of the command: ready to transmit, ready to receive, request for authentication, message available, request for sending a message, frame redundancy, etc. The following frame, with a length equal to four octets, contains the data needed for the command, for example the number of the messges available, the number of the message requested, the class of a subscriber, the degree of frame redundancy, etc.

The command messages are of vital importance if the communication is to take place properly. Consequently, in a preferred mode of embodiment, each octet can convey only one of the 16 combinations corresponding to a 4–8 encoding, i.e. to an encoding where 24 words expressed by 8-bit combinations, each combination being different from all the others with a degree of difference or a "minimum distance" equal to 4. Thus any risk of confusion among the commands is practically eliminated.

In the preferred mode of embodiment, all the frames are transmitted at least four times (if necessary, eight times);
  each frame comprising data is transmitted four times and is itself interlaced with three other frames which are also transmitted four times, making up a "super frame" with a length of 16 frames.
  For the command messages, each frame is transmitted four times and interlaced three times with itself, and this in fact amounts to setting up, for the data frames, a 16-frame "super frame" with 16 times the command frame considered. If the four-octet data field has not been completely used, the available bits can be used to convey the parity bits which will make it possible, at reception, to detect errors after decoding.

A command message comprises a single "super frame" while a data message any comprise several "super frames", 16 at the most if the length of the messages is limited to 256 frames.

In the transmitting part, the buffer memory 2 is charged with packets of data bits $PQ(D_i)$ with $D_i=D_0$ . . . $D_{max}$ and packets of command bits $PQ(C_i)$ with $C_i=C_0, \ldots C_{max}$ constituting the message to be transmitted and comprising, at the most, 256 four-octet packets. At the start, the ACK segments, which correspond to the acknowledgment by the addresssee of each packet received, are empty. In the receiver part of the addressee, the buffer memory 16 which comprises, for each frame, a segment PQ of data $D_0, D_1 \ldots D_{max}$, or a segment PQ of commands $C_0, C_1 \ldots C_{max}$, and a received-frame indicating segment R is empty, the frame-indicating segments being in the 0 state. The communication between two transmitter-receiver stations may entail a protocol which uses the exchange of command messages, then a data message and finally, command messages. If other data has to be transmitted, the communication will continue in the same sequence until interruption.

The following explanation specifies the main stages of the transmission method which will be described in detail and more systematically further below.

When an interlaced "super frame" is received, it is first of all re-ordered by the circuit 11 (FIG. 2) then each of the components is decoded by correlation with error correction in the correlating circuit 12. The header, comprising a pseudo-random string of 31 or 32 bits, leads to the acquisition of frame synchronism by self-correlation. The correlation is done modulo 7 bits, the correlator being open to make a correlation at each clock stroke. The correlation is said to be sliding. Since the frame has a fixed format, the device is capable of recognizing the start of a frame.

The pseudo-random 7-bit string, which is then used for the overcoding of the frame number field (or nature of the command) and of the data field, is less powerful as regards error-correcting possibility, but provides for an increase in the flow as compared to the case where the same type of encoding as for the header would be used. This relative decrease in the corrective power of the second part of the frames is "compensated" for by the repetition of the frames and their interlacing, and by their re-transmission in the event of non-reception. A maximum of five errors are corrected in the pseudo-random string with 31 or 32 bits, and three errors are corrected in a pseudo-random string with 7 bits.

Because each data frame is transmitted four times, the useful elements extracted after the decoding of the super frame can be used to restore the original data by comparing the results of the four decodings and by majority vote in the decision circuit 14.

Since the command frames are, for their part, transmitted 16 times, the results of the first four votes may, in a cascade, undergo a second comparison and a second 2/4 majority vote. When a frame is acknowledged to be valid, the data packet is arranged in the memory at the address deduced from the frame number, and the segment indicating that the corresponding frame is received, R, is placed in the state 1. Simultaneously this receiving part of the station transmits an order to the transmitting part to send the sending station an acknowledgment frame bearing the number of the received and accepted frame.

The acknowledgment frames comprise only headers and number indications; since the frames have a constant format, the five octets of the "number" and "data" fields are used to convey the number of the acknowledged frame five times. This arrangement increases the probability of the reception of this acknowledgment frame by comparison and 2/5 majority vote in each frame at reception, in the reception part of the sending terminal. The same applies to frames acknowledging command frames. The sending station takes note of acknowledgments by forcing the acknowledged frame indicator ACK to the state 1; this indicator prevents the subsequent transmission of these frames which are acknowledged and which are, therefore, properly received by the addressee terminal.

The non-acknowledged frames i.e. those for which a test by the transmission command circuit on the ACK indicator shows that they have not been properly received by the addressee terminal, are selectively retransmitted at the end of the first transmission of the message, until acknowledgment or, a the case may be, at the end of a pre-determined period set by a timing system.

The command frames convey data which can be used to carry out a validity check on the entire message: the command data packets of these frames $C_0, C_1 \ldots C_{max}$ are stored in the part 9 of the transmission circuit buffer memory and in the part 18 of the receiver circuit buffer memory where they are used to decide on whether to accept or reject a message; this data therefore comprises an overall error-detection scale.

Once the message is transmitted, whether the data message has been accepted or rejected, the terminals are again ready to exchange command messages, and any transmission of a data message is repeated in the manner indicated above.

The error-rate measuring circuit 20, linked to a correlating circuit output 12 in the receiving part, counts the number of errors detected and corrected in the correlating circuit 12, an operation which gives a measure of the quality of the link:

If the link is of good quality, i.e. if the number of errors detected stays below a certain threshold, and if this quality is relatively stationary, the addressee terminal sends, sandwiched between two data acknowledgment super frames, a message ordering the decrease or elimination of the frame redundancy in the transmitting terminal.

If, on the contrary, the quality of the link deteriorates, the addressee terminal sends a control message, in the same way, between two super frames, so that the redundancy of the frames can be re-established.

Like any other message, the command message will be acknowledged by the transmitted terminal if it is properly received by it, and the acknowledgment is provided for with an indication of whether the redundancy is modified or not.

The decision circuit of the receiving terminal which, as indicated above, functions by comparing the various repeated, decoded frames and by majority vote, has an adaptable decision rate. The level needed to obtain an acknowledgment by majority vote can vary according to the redundancy rate introduced into the link, i.e. the number of repetitions of a frame. During a modification of the redundancy in the transmitter terminal, following a change in the quality of the link, the addressee terminal thus adapts its majority vote in the decision circuit 14. The data frames and the command frames can be alternated as indicated above; to specify and distinguish them, the frame headers are pseudo-random strings with 31 or 32 complementary bits.

The annex memory circuit 19 retains, in memory, the frames which have been received, decoded and not accepted by the decision circuit during a first reception. This annex memory circuit makes it possible to avoid losing the benefit of the information received during the first reception, thus making it possible to reduce the number of repetitions needed and to reduce the proportion of frames considered to be right for reception during a second repetition: for example, during a first reception, with a redundancy of the order of 4, i.e. where each frame is transmitted four times, the decision circuit applies a majority vote of the 2/4 type, i.e. the frame is considered to be properly received when two frames out of four are identical. When a frame of this type is considered to be poorly received, i.e. when there are no two identical data packets in the four repetitions of a given frame, these decoded frames are kept in annex memory in the memory 19, and the frames received during a second repetition, i.e. four frames, are used with the former four decoded frames received. The decision circuit can then consider whether a frame detected three times in the total weight of eight repeated frames has been properly received. The power of the transmitting method is thus increased.

The transmission method according to the invention, which uses the transmitter-receiver of the type described with reference to FIGS. 1 and 2, will be described in greater detail below with reference to FIGS. 3 and 4, which represent the flow charts for the management of a station, for the transmission respectively of a command message and then a data message by a station in transmitting position, and with reference to the FIGS. 5 and 6 which represent the flow charts for the management of a station in receiving position for the reception of a command message followed by a data message and the transmission of the corresponding acknowledgment frames.

The sequencing of a sequencer circuit or the programming of a computer or a microprocessor according to these flow charts is within the scope of the specialist.

The procedure for setting up the link between these two stations, the sending station and the addressee station, according to the usual signalling protocols, has not been given in detail.

Once the connection between these two stations is set up, the actual transmission of the command messages and the data message can begin. The first type of message sent by the sending station, FIG. 3, is a command message made up of a super frame. To decide on its transmission, a test is conducted on the acknowledgment bit ACK($C_j$) of the first command message $j=0$. The result of this message being negative, the first stage is the composition of the command frame according to the model indicated above, with a header, the octet relating to the nature of the command and the data octets of this command forming the command data packet $C_j$ (the first being $C_0$) to be transmitted. The second stage, still in the sending station, then consists in overcoding this frame, repeating it 16 times, interlacing these 16 frames and then commanding the transmission of the thus-formed super frame, constituting the command message, to the addressee station in receiving position.

The receiver station receives the command super frame, FIG. 5. During this first reception, an index n which is initially at 0 is set at 1 by the operator $n=n+1$. After reception, the receiver re-orders and then decodes the coded fields. It then carries out a sequence of four 2/4 majority votes, by group of four decoded frames, one frame being initially considered to be correct if it appears twice in each group of four frames. Then, a fifth 2/4 majority vote is taken on the basis of the four preceding results:

If the result of the fifth vote is positive, the command frame is considered to have been properly received, the index n is zeroized and an acknowledgment frame is composed in the addressee station. This frame comprises the header and repeats the nature of the command in five octets, the being no data to be transmitted in this type of frame. This frame is encoded and then repeated 16 times and interlaced to form an acknowledgment super frame which is then transmitted to the sending station.

If the result of the fifth vote is negative, the command frame is not correctly received. A test is then conducted on the duration of the time delay by a test on a value $N_1$, the limit number of repetitions of a command message before interruption. The index n, which undergoes an iterative process at each fresh reception of a command message, is tested in relation to $N_1$.

If n is less than $N_1$, the period of the time delay is not exceeded and the addressee station remains in receiving position. Since the transmitter station has not received the acknowledgment frame, the same command frame is re-transmitted as described below, until an acknowledgment frame is received by the sending station, or until the test on the duration of the time delay shows that the period has been exceeded.

When this duration is exceeded, n equal to or greater than $N_1$, the link ends in a failure.

In the transmitter station, the acknowledgment frame is received, then re-ordered and decoded, and in each of the elementary acknowledgment frames, a 2/5 majority vote is taken on the command nature field repeated in five octets. Then, the octets chosen in the 16 frames undergo 2/4 majority votes in groups of four. A final test is then made on the results of these four votes by a final 2/4 majority vote:

If the result is positive, the properly received and properly acknowleded message can be used to update the corresponding acknowledgment bit ACK($C_i$) in the part 9 of the memory 2, and the following command message or a data message can then be transmitted;

If the result of the final test is negative, the message cannot be acknowledged, and a test is then conducted on the time delay period, using the index n as in the addressee station. This index n is tested with respect to the number $N_1$, which is the limit number of message repetitions, and this index n undergoes an iterative process, $n=n+1$, at each fresh transmission of a command message.

If n is smaller than $N_1$, the limit period is not exceeded and the transmission of the same command message according to the same procedure is begun again.

On the contrary, if n is greater than or equal to $N_1$, the consequence, as in the addressee station earlier, is the failure of the link.

Following the transmission of the first command message, it is possible either to re-transmit another command message with $PQ(C_{j+1})$ (towards A) or a data message (towards B).

The data message is transmitted in the following way described with reference to FIGS. 4 and 6 which respectively refer to the sending station of the data message and the corresponding addressee station.

First of all, in the sending station, a test on the the ACK acknowledgment bits of the data packets leads to the extraction of the first four data fields to be transmitted, which have not yet been acquired by the addressee station. The four corresponding data frames are composed according to the model indicated above, with the header field, the one-octet frame number field, and the four-octet data field. These four frames are then encoded, repeated four times and then interlaced to form a super frame of data. If N is the length of the data message to be transmitted, counted in the number of super frames, an initially zeroized index i is set at 1, by $i=i+1$ for this first super frame which is ready for transmission, then a test is made on the value i with reference to N:

If i smaller than N, then the management circuit orders the composition of another super frame in the same way as above by searching for the following four data fields which have not yet been acquitted.

If i is equal to N, then the data message is complete and its transmission to the addressee is ordered.

The sending station is then placed in receiving position to receive acknowledgment frames relating to the data messages transmitted which will be generated by the addressee station.

In this addressee station, as depicted in FIG. 6, after the data message super frames have been re-ordered and decoded, a 2/4 majority vote at the decision circuit 14 of the addressee station, for each set of four frames corresponding to the repetition of one and the same frame, leads to the memorizing of properly received data packets among the four frames of each super frame, and to the updating in the memory 16 of the corresponding received-frame indicators R. The numbers of the properly received frames are memorized with a view to their transmission by means of the acknowledgment frames.

These data acknowledgment frames are made up in the same way as the data frames themselves, but each frame number is repeated five times as for the acknowledgment frames of the command messages. When the corresponding acknowledgment frame is transmitted, the addressee station makes a test on the state of the received frame indicators R to find out whether all the frames have been acknowledged. If this is not the case, the addressee station places itself again in receiving position, pending the re-transmission of data frames which have not been correctly received (towards D).

If, on the contrary, all the frames have really been acknowledged, a so-called "watch" counter is started to keep the station in a position of awaiting reception, in case acknowledgment frames have not been properly received by the sending station and the corresponding data frames have been re-transmitted. A test on the counting duration is made until the limit value is reached.

The transmission of a command frame can then be started if the transmission of data contained in the first data messages and, possibly transmitted in case of poor reception, is completed.

During this watch period, the acknowledgment frames transmitted by the addressee station are received by the sending station. They are re-ordered, then decoded (see FIG. 4). A 2/5 majority vote is taken on the five octets of each of the elementary acknowledgement frames. Then the results of these majority votes are put through another 2/4 majority vote to use the repetition on five frames of acknowledged frame numbers. This test leads to the memorizing, in order, to the acknowledged frames, with each of the corresponding ACK indicators changing their state for each of the frames. An index i is set at 1, then undergoes a iterative process for each acknowledgment super frame of data received, and a test is conducted on the value of this index in relation to the length of the data message N counted in super frames.

If all the data acknowledgment super frames have not been received, i.e. if i is smaller than N, the sending station is again placed in position to receive the data acknowledgment super frames. If, on the contrary, i is equal to N, then the system is reset in the testing position on the acknowledged-frame indicator bits ACK of the corresponding message to find out if all the data has been properly received. If certain acknowledgment bits have not been updated, the corresponding data frames have not been properly received and the transmitting station re-transmits the frames which have not yet been acknowledged, in returning to the stage of the composition of frames which have not yet been acknowledged. On the contrary, if all the frames have been acknowledged, the sending station can order the transmission of the command frames which follow the transmission of a data message (towards A).

In the above precise description, the flow charts of FIGS. 4 to 6 do not outline the auxiliary functions which make it possible to increase the rate, for example, by eliminating the repetition of frames when the link is considered to be of good quality or which, on the contrary, make it possible to reintroduce this repetition when the quality of the link deteriorates. It is, however, within the scope of the specialist to introduce these functions into the diagrams.

The invention is not limited to the mode of embodiment which has been precisely described and depicted herein. In particular, in the description of the method according to the invention, the repetition of frames has been indicated as being carried out on the basis of an interlacing of the order of 4, each frame being repeated four times, this set of four frames being then interlaced. The interlacing order may be different: in particular, it is possible to make a repetition of frames with an interlacing of the order of 8.

What is claimed is:

1. A method for the transmission and reception of digital data by command and data messages comprised of frames, on duplex links between transmitter and receiver stations, said method comprising the steps of:

transmitting, from said transmitter station, command messages, each command message comprised of frames made up of a packet of data comprising the nature of a command and the corresponding data, and data messages, each data message comprised of frames made up of N packets of information each comprising a packet of data and an associated order number;

receiving of said command and data messages by said receiver station, transmitting from said receiver station acknowledgement frames in which, for a command message, the nature of the command is retransmitted to the sending station and, for a data message, the order numbers of the properly received data packets are retransmitted to the transmitting station, receiving of said acknowledgement frames by said transmitter station, repeating of said command message by said transmitter station, if the corresponding acknowledgement message is not received, and the selective repeating of frames made up of data packets, the order numbers of which have not been detected in the acknowledgement frames.

2. A method according to claim 1, further including the steps of:

repeating of messages, and, forming each message of K.N. elementary frames, K elementary frames forming a super frame and N being the length of the messages counted in said super frames, each super frame being made up by interlacing $K_1$ elementary frames comprising different information packets, each one repeated $K_2$ times with $K=K_1+K_2$, wherein the acknowledgment frames and the messages made up of acknowledgement frames have the same formats as the frames and command and data messages respectively fo which they report proper reception, and wherein the decision relating to the clear or poor reception of the command and data frames in the addresee station and of the acknowledgement frames in the sending station are obtained by a majority vote on the frames repeated for each type of message.

3. A method according to claim 2, further including the steps of:

repeating said command messages, said command messages having only one information packet, $K_1=1$, repeated $K=K_2=16$ times, repeating the data messages, said data messages comprising $K_1=4$ packets of information repeated $K_2=4$ times before interlacing, said super frames having the same length regardless of the type of messages transmitted.

4. A method according to claim 2, further including the step of:

repeating the nature of the command, if needed, and repeating the number of data packet, if needed, in the acknowledgement frames throughout the length assigned to a packet of information in a control and data frame.

5. A method according to claim 1 further including the steps of:

self correlating each frame comprising a header and encoding of the information packet which follows the header for the correction of errors by correlation.

6. A method according to claim 5, further including the steps of:

self correlating by the header, said header comprising a pseudo-random sequence with a length equal to four octets to the nearest bit, with self correlating characteristics permitting up to six error corrections, and, encoding by said information packet comprising one octet for the nature of the command, if needed, and the number of a data packet, if needed, and four octets for the command data, if needed, and four octets for the data packet, if needed.

7. A method according to claim 6, further including the step of:

designating the command and data frames of said information packets by using pseudo-random sequences with different headers.

8. A method according to claim 5, further including the step of:

encoding by expansion the information packets for error correction by using a 7-bit psuedo-random sequence, and decoding by correlation at reception allowing for up to three error corrections.

9. A method according to claim 6, further including the step of:

encoding by expansion the information packets for error correction by using a 7-bit psuedo-random sequence, and decoding by correlation at reception allowing for up to three error corrections.

10. A method according to claim 7, further including the step of:

encoding by expansion the information packets for error correction by using a 7-bit pseudo-random sequence, and decoding by correlation at reception allowing for up to three error corrections.

11. A method according to claim 6, further including the step of:

pre-coding of the octets relating to the nature of the commands, where each octet, before coding, can only be one of the 16 octets chosen from among the $2^8$ possible, each one being different from all of the others by at least four bits.

12. A method according to claim 11, further including the step of:

pre-coding the command data as the command nature octet.

13. A method according to claim 6, further including the step of:

measuring the quality of the link made at reception in the addressee station by counting the errors detected and corrected by correlation.

14. A method according to claim 13, further comprising the step of:

modifying the number of repetitions of $K_2$ transmitted information according to the measurement of the quality of the link, this number being diminished when the link is of very good quality and being augmented to a higher value when the quality of the link deteriorates.

15. A method according to claim 2, further including the step of:

storing of information packets considered as being poorly received at reception and comparison with the frames received after repetition, the conditions of the majority vote being consequently modified.

16. A device for data transmission, by messages made up of frames, comprising transmitter and receiver stations designed to work in duplex, wherein each station comprises:

a transmission control circuit included in said transmitter station and coupled to a transmission pointer;

a transmission memory for storing information packets to be transmitted in said frames and for storing an acknowledgement indicator associated with each of said information packets, the input of said transmission memory being coupled to said transmission pointer which addresses said information packets;

a frames generator coupled to the output of said tansmission memory, coupled to said transmission control circuit, and coupled to an encoder which is linked to memory;

a repetition and interlacing circuits coupled to said frame generator's output, said repetition and interlacing circuit being coupled to a transmission device;

a receiver device included in said receiver station and coupled to a reordering circuit;

a correlating circuit coupled to said re-ordering circuit;

a decision circuit functioning by majority vote coupled to the data output of said correlating circuit;

a receiver memory for storing properly-received said information packets and for storing a reception indicator linked to said information packets, the input of said receiver memory being coupled to the validated data output of said decision circuit;

an error-rate measuring circuit linked to the output of said correlating circuit, a reception control circuit connected to the output of said error-rate measuring circuit, said reception control circuit having outputs which are coupled to said decision circuit and to said reordering circuit, said reception control circuit being connected to transmission memory.

17. A device according to claim 16, further comprising:

an annex memory, in the receiving station, for the storing of information packets which are considered to be poorly received, said annex memory being coupled to said decision circuit.

* * * * *